United States Patent
Lin

(10) Patent No.: US 8,387,938 B2
(45) Date of Patent: Mar. 5, 2013

(54) ELECTRONIC DEVICE HOLDER

(75) Inventor: Chung-Hung Lin, Tainan (TW)

(73) Assignee: Jow Tong Technology Co., Ltd., Tainan (TW)

( * ) Notice: Subject to any disclaimer, the term of this patent is extended or adjusted under 35 U.S.C. 154(b) by 126 days.

(21) Appl. No.: 13/097,308

(22) Filed: Apr. 29, 2011

(65) Prior Publication Data
US 2012/0273644 A1 Nov. 1, 2012

(51) Int. Cl.
*A47G 1/24* (2006.01)

(52) U.S. Cl. ......... 248/456; 248/397; 248/454; 248/448

(58) Field of Classification Search .................. 248/397, 248/448, 454, 456, 688, 923
See application file for complete search history.

(56) References Cited

U.S. PATENT DOCUMENTS

| | | | | |
|---|---|---|---|---|
| 3,952,989 A * | 4/1976 | Bannister Hatcher | ........ | 248/453 |
| 4,592,285 A * | 6/1986 | Egli | ................................ | 108/9 |
| 4,978,096 A * | 12/1990 | Struckmann | ................... | 248/451 |
| 5,035,393 A * | 7/1991 | Menaged | ..................... | 248/456 |
| 5,646,447 A * | 7/1997 | Ramsey et al. | ................ | 257/727 |
| 5,915,661 A * | 6/1999 | Silverman et al. | ......... | 248/465.1 |
| 6,679,468 B1 * | 1/2004 | Hsu | ................................ | 248/454 |
| 6,918,565 B2 * | 7/2005 | Chang | ............................. | 248/448 |
| 7,073,449 B2 * | 7/2006 | Pipkin | ............................. | 108/44 |
| 7,101,209 B2 * | 9/2006 | Yates et al. | ....................... | 439/331 |
| 7,104,516 B2 * | 9/2006 | Uto et al. | ........................ | 248/688 |
| 7,540,466 B2 * | 6/2009 | Yang | ................................ | 248/688 |
| 7,614,599 B2 * | 11/2009 | Moon et al. | ..................... | 248/454 |
| 7,618,017 B2 * | 11/2009 | Mamizuka et al. | ............ | 248/677 |
| 7,626,405 B2 * | 12/2009 | Eldridge | .................. | 324/750.19 |
| 7,686,272 B2 * | 3/2010 | King | .............................. | 248/448 |
| 7,751,555 B2 * | 7/2010 | Yoshida et al. | ................ | 379/436 |
| 7,762,519 B2 * | 7/2010 | Kunii et al. | ..................... | 248/688 |
| 7,841,473 B2 * | 11/2010 | Huang et al. | ................... | 206/759 |
| D644,230 S * | 8/2011 | Lin | .............................. | D14/447 |
| 8,011,636 B2 * | 9/2011 | Fukuda et al. | ................ | 248/685 |
| 8,220,759 B2 * | 7/2012 | Shimotoso | .................... | 248/133 |
| 2005/0164530 A1 * | 7/2005 | Yates et al. | ....................... | 439/73 |
| 2006/0108494 A1 * | 5/2006 | Lancet | .......................... | 248/456 |

* cited by examiner

*Primary Examiner* — Terrell McKinnon
*Assistant Examiner* — Daniel J Breslin
(74) *Attorney, Agent, or Firm* — Rosenberg, Klein & Lee

(57) ABSTRACT

An electronic device holder is revealed. The electronic device holder includes a base, a top cover and a support member. In use, a control member of the support member is pressed so that a locking shaft is moved inwards to push a shaft part moving into a pivot hole of an assembly block of the base. And a teeth part around the shaft part is released from teeth of a locking hole. Thus the support member can be rotated to the required position. Without any force applied to the control member, the teeth part of the shaft part is engaged with the teeth of the locking hole again due to the elastic member. Thus the support member is locked, the support block is then rotated to the required position and an electronic device is leaning against the support member. Therefore users can use electronics conveniently, without holding them in hands.

2 Claims, 7 Drawing Sheets

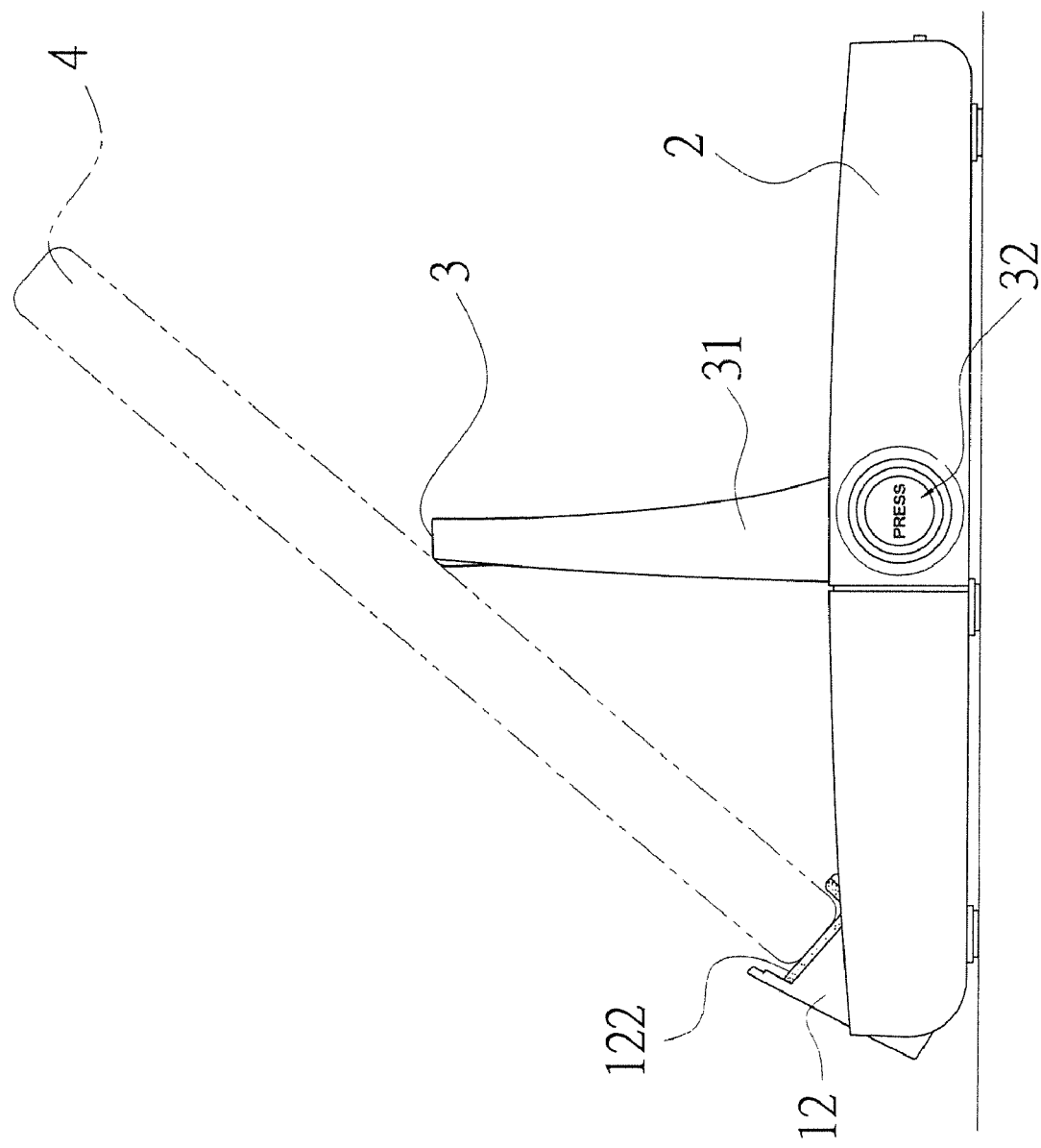

ELECTRONIC DEVICE HOLDER

BACKGROUND OF THE INVENTION

1. Field of the Invention

The present invention relates to an electronic device holder, especially to an electronic device holder used to support and lock an electronic device so that users can operate electronic devices such as tablet personal computers, or smart phones conveniently without holding the electronic device in hands. The electronic device holder has more practical value.

2. Description of Related Art

With the rapid development of technology, various types of easy-to-use electronic devices have been provided. Among them, personal electronics such as mobiles phones and tablet personal computers have become our daily essentials, not only used to arrange schedules and process various data, but also to carry out searches via the internet. Moreover, people can also use these electronics to display multimedia information for entertainment.

Although the above personal electronic devices can achieve various effects the users expected such as read and run various multimedia files, they have certain shortcomings. In use, the user needs to hold the electronic in his hand(s). Once the user intends to search via the internet or read multimedia files for a long time, this cause inconvenience. Thus there is a need to provide a novel device that solves the above problem.

SUMMARY OF THE INVENTION

Therefore it is a primary object of the present invention to provide an electronic device holder that allows users setting and locking the electronic devices thereon conveniently, without holding the electronics in hands while using electronic devices such as tablet personal computers, or smart phones. The electronic device holder has more practical value.

In order to achieve the above object, an electronic device holder of the present invention includes a rotatable support block mounted in pivot slots between a base and a top cover and a support part of a support member that is pivoted to the rotatable support block and mounted in a receiving slot on each of two sides of the top cover by a shaft member. In use, a control member of the shaft member is pressed so that a locking shaft of the shaft member is moved inwards to push a shaft part moving into a pivot hole of an assembly block of a base. And a teeth part around the shaft part is released from teeth on an inner surface of a locking hole. Thus the support member can be rotated to the required position vertically. Without any force being applied to the control member of the shaft member, the teeth part of the shaft part is engaged and locked with the teeth on the inner surface of the locking hole again due to elastic support of the elastic member. Thus the support member is locked on the required position. Then the support block is rotated to the required position so that the bottom end of an electronic device is leaning against the groove and the rear end of the electronic device is against the support member.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 7 is a schematic drawing showing a side view of an embodiment in use according to the present invention.

DETAILED DESCRIPTION OF THE PREFERRED EMBODIMENT

Figure 1:
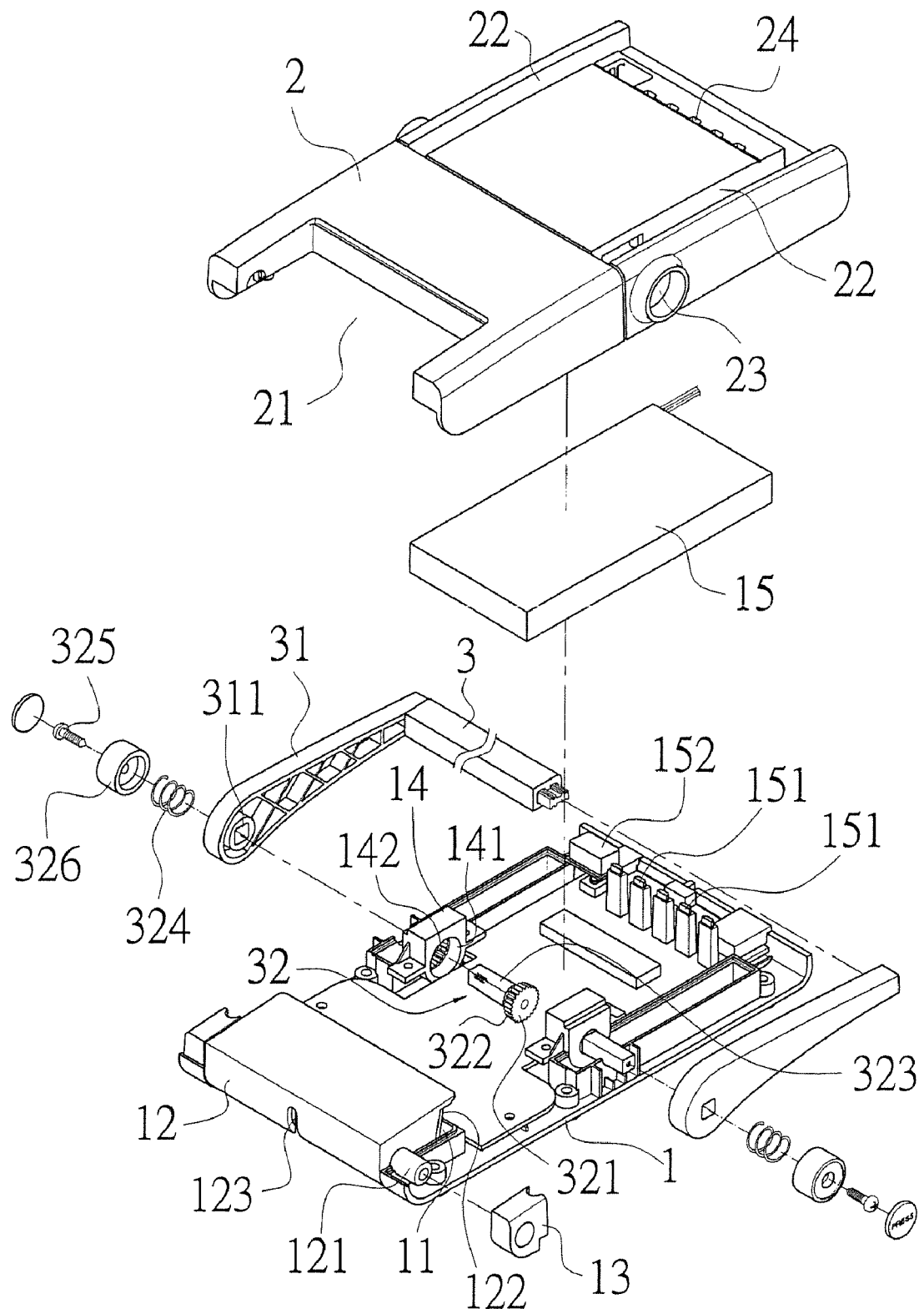
FIG. 1 is an explosive view of an embodiment according to the present invention.

Refer to FIG. 1, an electronic device holder of the present invention includes a base 1, a top cover 2 and a support member 3.

The base 1 includes a pivot slot 11 and a support block 12 arranged movably in the pivot slot 11. Two pivot shafts 121, corresponding to each other, are respectively disposed projectingly on each of two sides of the support block 12. The pivot shaft 121 is pivotally received in a pivot block 13 on the base 1. The support block 12 includes a groove 122 disposed on a top end and a through hole 123. An assembly block 14, having a pivot hole 141 on an inner side and a locking hole 142 on an outer side, is arranged at each of two sides of the base 1. The locking hole 142 has a plurality of teeth projecting from an inner surface thereof. The pivot hole 141 and the locking hole 142 are connected to each other. Moreover, an auxiliary battery 15 is mounted in the base 1 while a power indicator 151 and a charger connector 152 corresponding to the auxiliary battery 15 are disposed on the base 1.

The top cover 2 is disposed over the base 1 and having a pivot slot 21 corresponding to the support block 12 pivoted to the base 1, two receiving slots 22 respectively on each of two sides thereof, two penetrating shaft holes 23 respectively disposed on each of two sides thereof, and a transparent part 24 corresponding to the power indicator 151 of the base 1. The receiving slot 22 is on the outer side of the assembly block 14 of the base 1 and the shaft hole 23 is on the outer side of the receiving slot 22. The receiving slot 22 is corresponding to an outer side of the assembly block 14 of the base 1 while the shaft hole 23 is corresponding to the pivot hole 141 and the locking hole 142 of the assembly block 14.

The support member 3 consists of support parts 31 respectively arranged projectingly on each of two sides thereof and corresponding to the receiving slots 22 on each of two sides of the top cover 2, and shaft members 32. The support part 31 is mounted with a mounting hole 311 corresponding to the pivot hole 141, the locking hole 142 on the assembly block 14 of the base 1 and the shaft hole 23 of the top cover 2. The shaft member 32 is assembled with the mounting hole 311 of the support part 31. The shaft member 32 includes a shaft part 321 on an inner end thereof, a teeth part 322 around the shaft part 321, a locking shaft 323 on an outer side of the shaft part 321, an elastic member 324, a fastener 325 and a control member 326. The shaft part 321 is corresponding to the pivot hole 141 and the locking hole 142 of the assembly block 14 while the teeth part 322 is corresponding to the teeth on the inner surface of the locking hole 142 of the assembly block 14. The locking shaft 323 is corresponding to the mounting hole 311 and the elastic member 324 is disposed around the locking shaft 323. The fastener 325 is used to fix the control member 326 on an outer end of the locking shaft 323.

Figure 2:
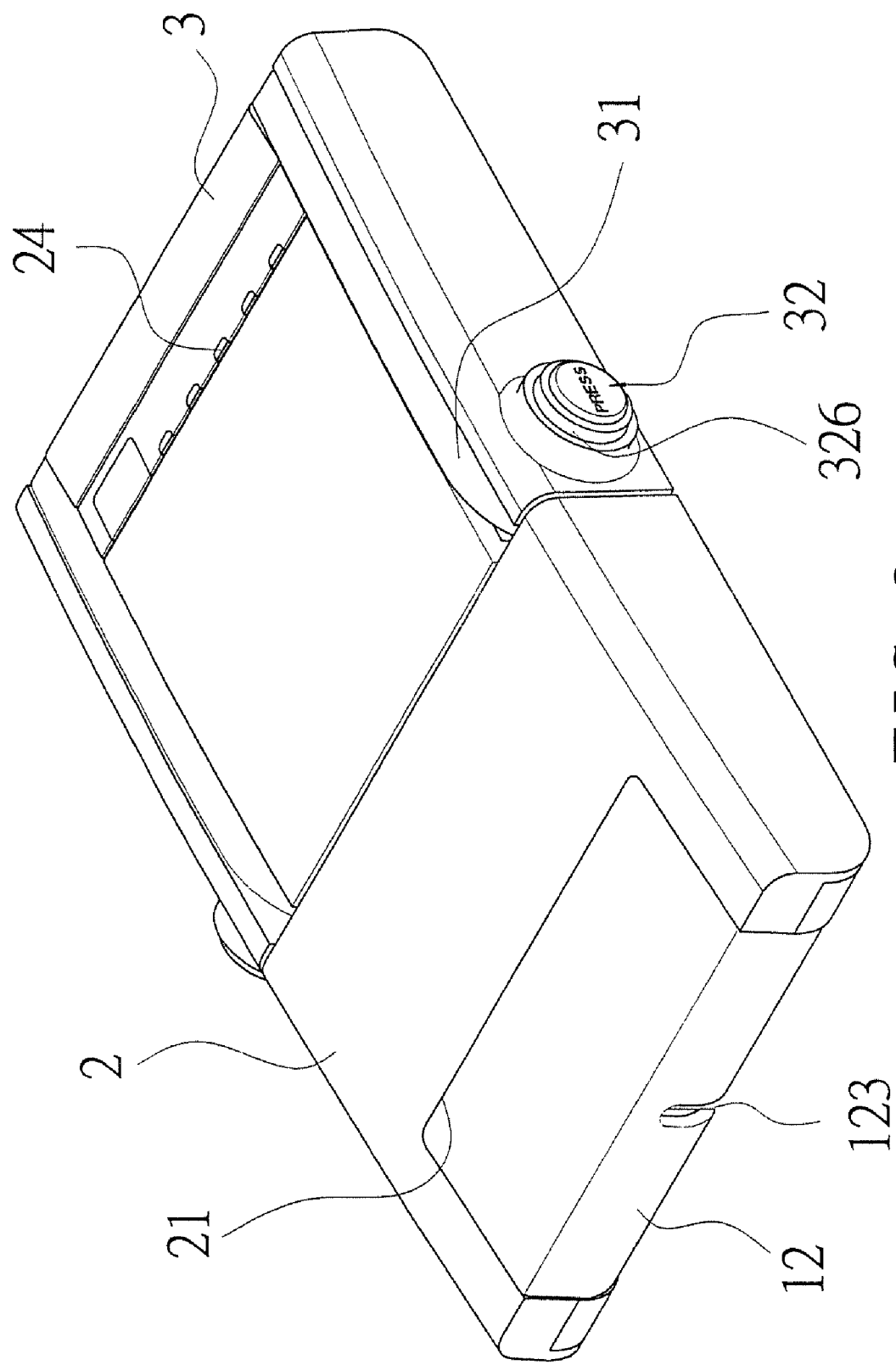
FIG. 2 is an assembled perspective view of an embodiment according to the present invention.
Figure 3:
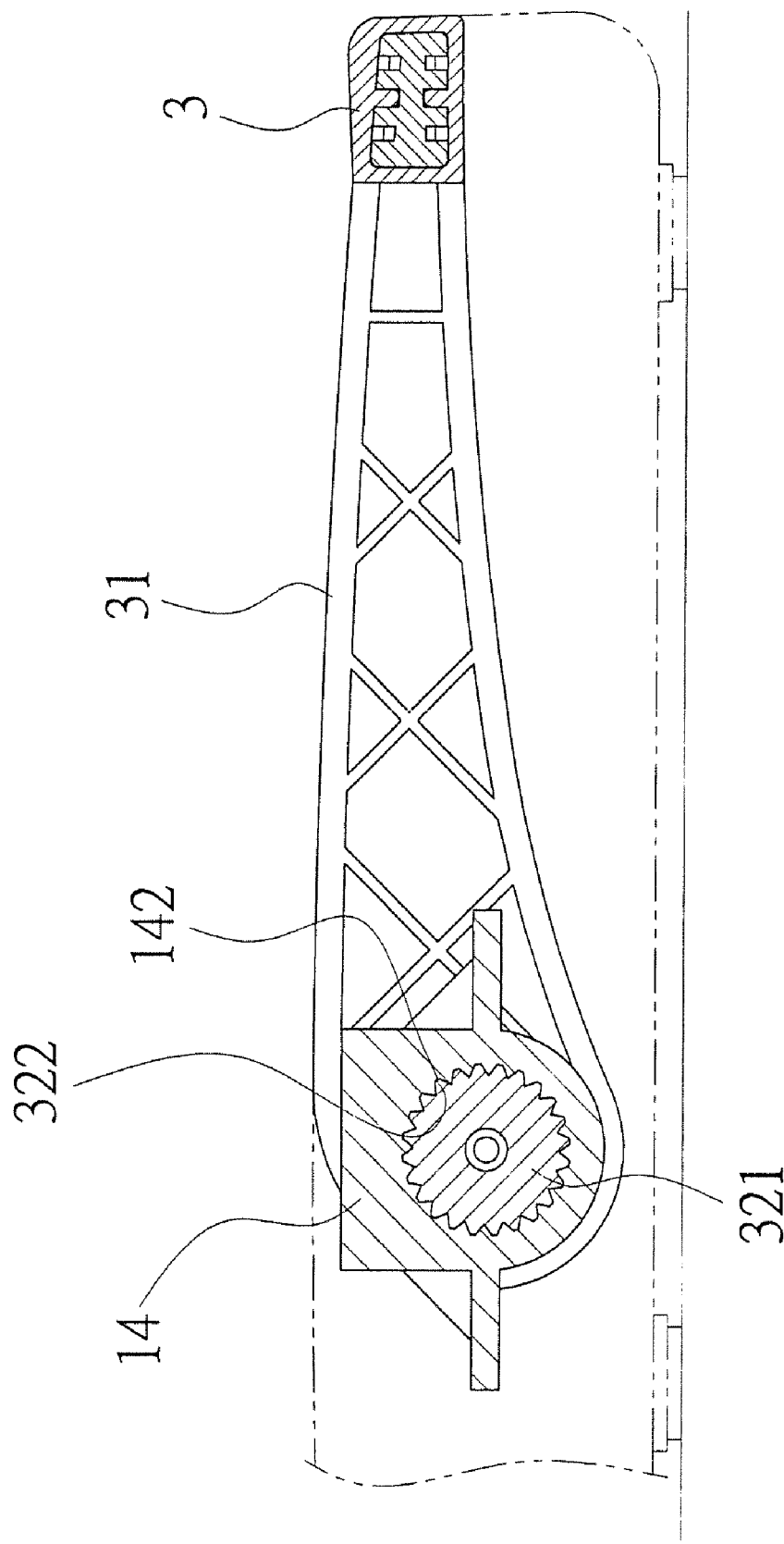
FIG. 3 is a side view of a partial enlarged cross section of n embodiment according to the present invention.
Figure 4:
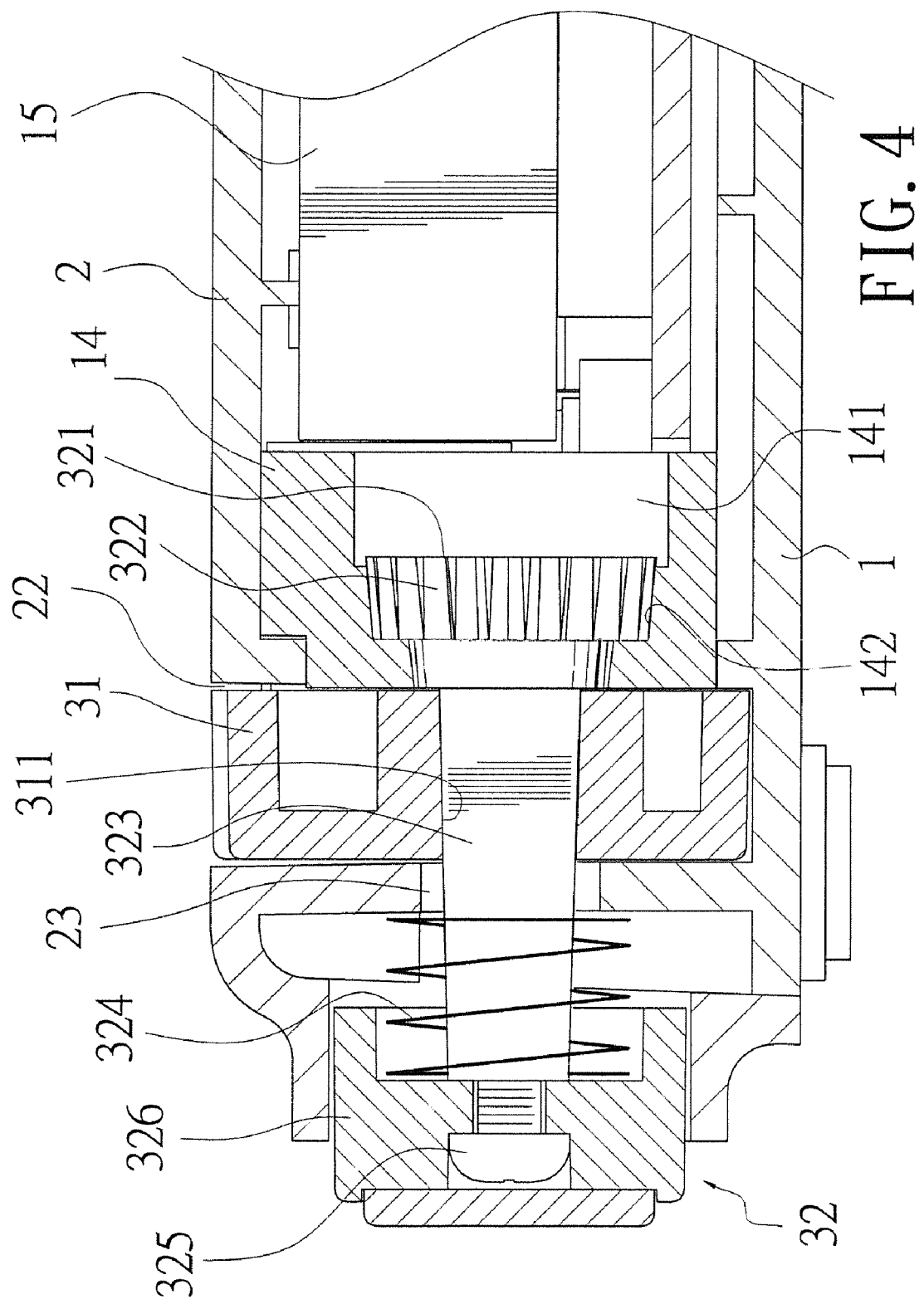
FIG. 4 is a front view of a partial enlarged cross section of an embodiment according to the present invention.

While being assembled, refer to FIG. 2, FIG. 3 and FIG. 4, the top cover 2 is arranged over the base 1 and the support block 12 is rotatable in the pivot slots 11, 21 between the base 1 and the top cover 2. Then the support part 31 of the support member 3 is received in the receiving slot 22 on each of two sides of the top cover 2 and the locking shaft 323 of the shaft member 32 passes through the pivot hole 141, the locking hole 142 of the assembly block 14, the mounting hole 311 of the support part 31 and penetrating the shaft hole 23 of the top cover 2. The locking shaft 323 and the mounting hole 311 of the mounting hole 311 are locked with each other. The part of the locking shaft 323 penetrating out of the shaft hole 23 is wound by the elastic member 324 and the control member 326 is fixed on the outer end of the locking shaft 323 by the fastener 325. Now one end of the elastic member 324 is against the shaft hole 23 while the other end of the elastic member 324 is against the inner surface of the control member 326. Thus the locking shaft 323 projects through the shaft hole 23 of the top cover 2 due to the elastic member 324, and the teeth part 322 of the shaft part 321 on the inner end of the locking shaft 323 is locked with the teeth on the inner surface of the locking hole 142 of the assembly block 14. Therefore, the support member 3 is unable to rotate due to the locked mounting hole 311 of the support part 31 and the locked locking shaft 323.

Figure 5:
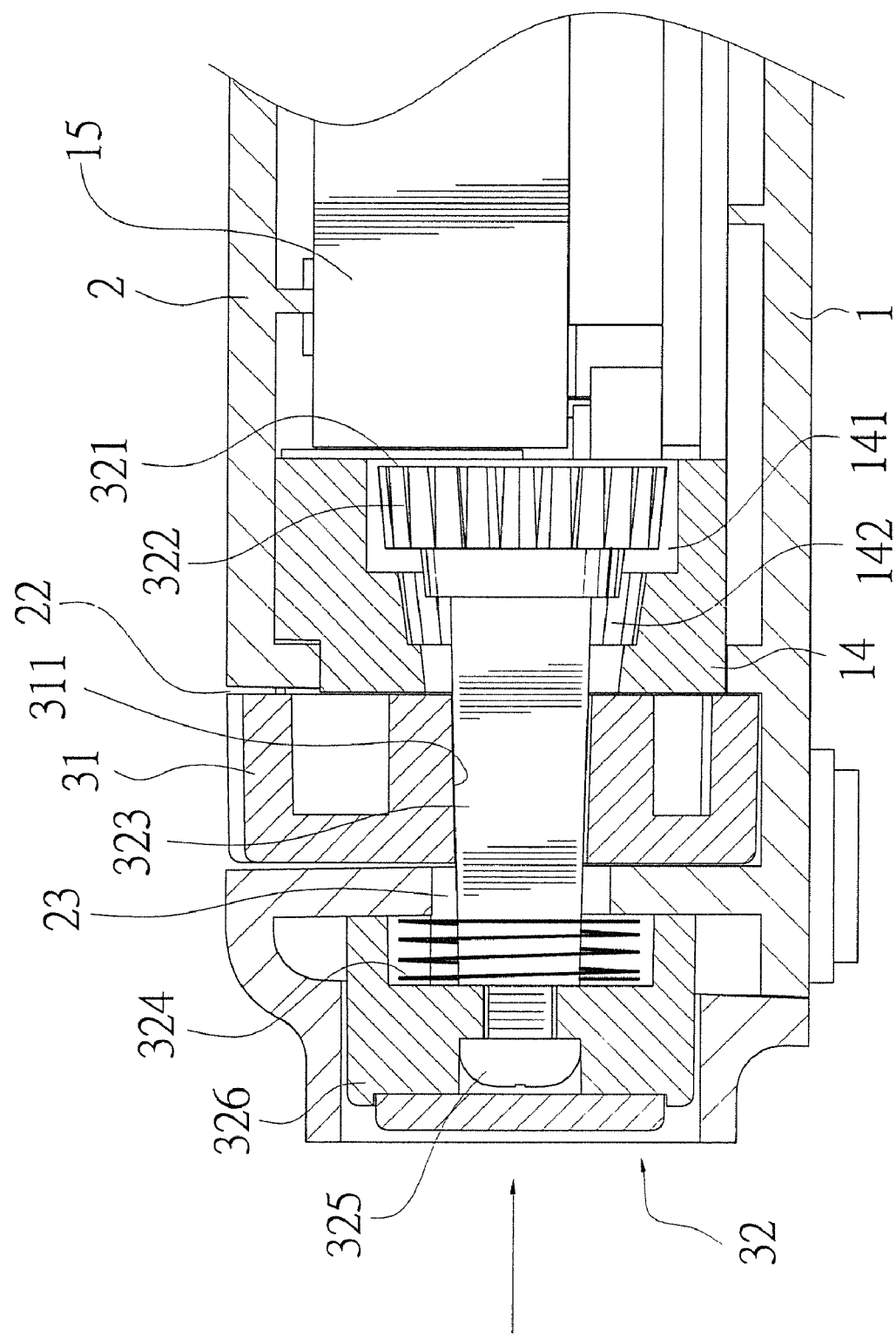
FIG. 5 is a schematic drawing showing movement of an embodiment in use according to the present invention.
Figure 6:
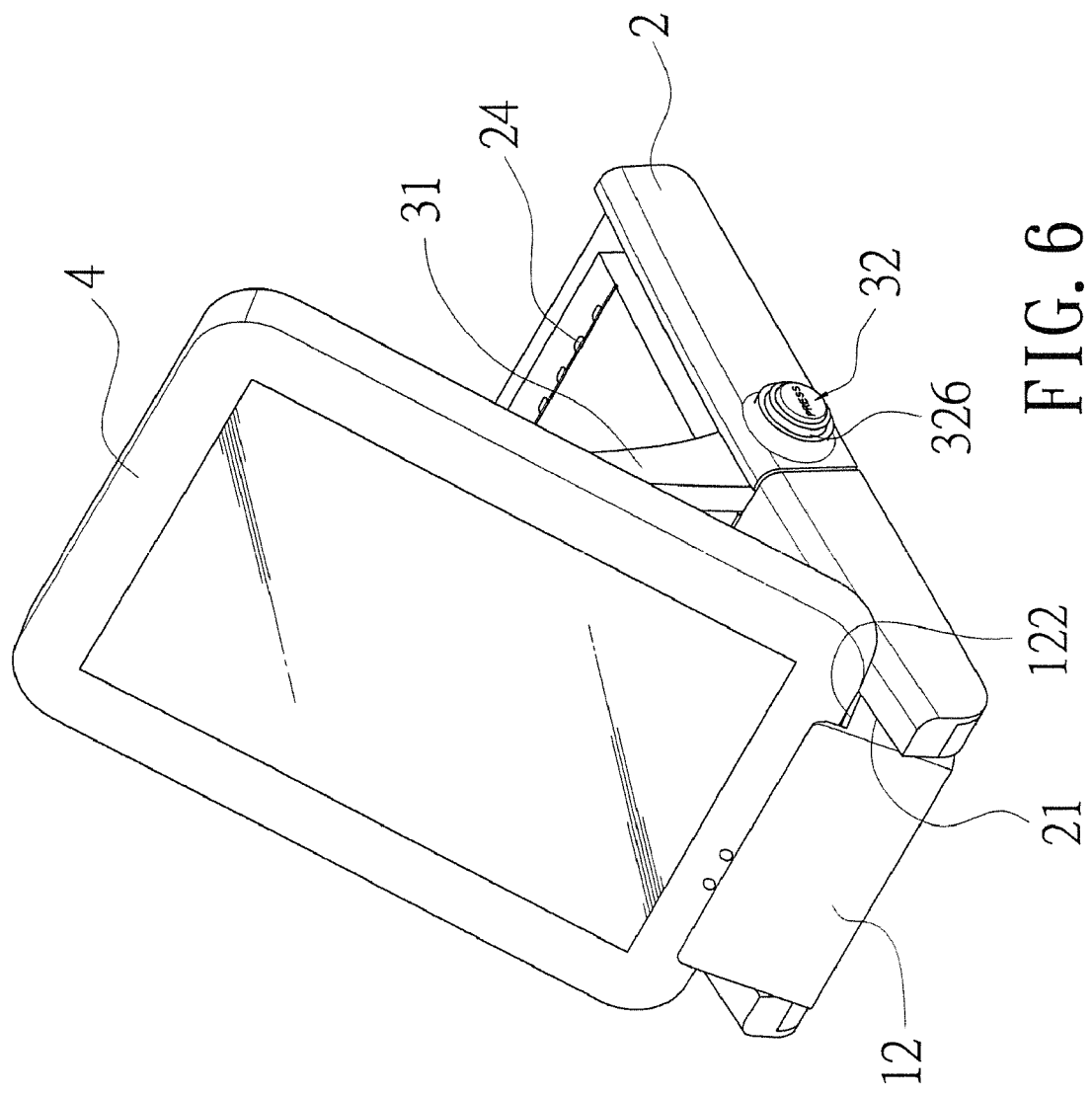
FIG. 6 is a perspective view of an embodiment in use according to the present invention.

Refer to FIG. 5, while in use, by the control member 326 of the shaft member 32 exposed outside the shaft hole 23 of the top cover 2 being pressed, the elastic member 324 around the locking shaft 323 is compressed toward the inner side. Thus the locking shaft 323 is moved inwards to push the shaft part 321 moving into the pivot hole 141 of the assembly block 14 of the base 1. And the teeth part 322 around the shaft part 321 is released from the teeth on the inner surface of the locking hole 142. Therefore the support member 3 can be rotated to the required position vertically. Without any force being applied to the control member 326 of the shaft member 32, the teeth part 322 of the shaft part 321 is engaged and locked with the teeth on the inner surface of the locking hole 142 again due to elastic support of the elastic member 324. Thus the support member 3 is locked and positioned on the required position. Then the support block 12 of the base 1 in the pivot slots 11, 21 between the base 1 and the top cover 2 is rotated to the required position so that the bottom end of an electronic device 4 is leaning against the groove 122 and the rear end of the electronic device 4 is against the support member 3, as shown in FIG. 6 and FIG. 7. Thus the users don't need to hold the electronic device 4 in their hands in use.

Moreover, while using the electronic device 4, once the power of the electronic device 4 is low, a wire passing through the through hole 123 of the support block 12 is used to connect the electronic device 4 with the auxiliary battery 15. Thus the auxiliary battery 15 supplies power to the electronic device 4. The power status of the auxiliary battery 15 is indicated by the power indicator 151 on the base 1, observed through the transparent part 24 of the top cover 2. Once the power of auxiliary battery 15 is low, it is charged through the charger connector 152.

In summary, compared with the structure available now, the electronic device holder of the present invention allows users setting and locking the electronic devices at different angles thereon easily and conveniently, without holding the electronics in hands while using electronic devices such as tablet personal computers, or smart phones. The electronic device holder has more practical value.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. An electronic device holder comprising a base, a top cover and a support member; wherein
the base includes a first pivot slot with a movable support block therein, two assembly blocks respectively arranged at each of two.

2. The device as claimed in claim 1, wherein two pivot shafts, corresponding to each other, are respectively disposed projectingly on each of two sides of the support block; the pivot shaft is pivotally received in a pivot block on the base; a second pivot slot corresponding to the support block pivoted to the base is arranged at the top cover.

* * * * *